United States Patent
Jaradi et al.

(10) Patent No.: US 10,800,370 B2
(45) Date of Patent: Oct. 13, 2020

(54) VEHICLE SEAT AIRBAGS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/243,765

(22) Filed: Jan. 9, 2019

(65) Prior Publication Data

US 2020/0216006 A1 Jul. 9, 2020

(51) Int. Cl.
| | |
|---|---|
| *B60R 21/207* | (2006.01) |
| *B60R 21/233* | (2006.01) |
| *B60R 21/013* | (2006.01) |
| *B60R 21/015* | (2006.01) |
| *B60R 21/2165* | (2011.01) |
| *B60R 21/00* | (2006.01) |
| *B60R 21/231* | (2011.01) |
| *B60R 21/01* | (2006.01) |

(52) U.S. Cl.
CPC .......... *B60R 21/207* (2013.01); *B60R 21/013* (2013.01); *B60R 21/01554* (2014.10); *B60R 21/2165* (2013.01); *B60R 21/233* (2013.01); *B60R 2021/0004* (2013.01); *B60R 2021/0032* (2013.01); *B60R 2021/01286* (2013.01); *B60R 2021/2074* (2013.01); *B60R 2021/23107* (2013.01)

(58) Field of Classification Search
CPC .... B60R 21/207; B60R 21/013; B60R 21/233
See application file for complete search history.

(56) References Cited

U.S. PATENT DOCUMENTS

| | | | |
|---|---|---|---|
| 5,782,529 A | 7/1998 | Miller, III et al. | |
| 5,788,271 A | 8/1998 | Sotelo | |
| 6,042,181 A * | 3/2000 | Goor | B60N 2/2806 297/216.11 |
| 7,607,511 B2 | 10/2009 | Sunabashiri | |
| 2004/0000802 A1* | 1/2004 | Clement | B60N 2/2806 297/250.1 |
| 2019/0303729 A1* | 10/2019 | Gramenos | G06K 9/00832 |

FOREIGN PATENT DOCUMENTS

| | | |
|---|---|---|
| EP | 1077154 B1 | 4/2007 |
| JP | 4861214 B2 | 1/2012 |
| JP | 2015198683 A | 11/2015 |
| WO | 2018043394 A1 | 3/2018 |

* cited by examiner

*Primary Examiner* — Faye M Fleming
(74) *Attorney, Agent, or Firm* — Frank A. MacKenzie; Bejin Bieneman PLC

(57) ABSTRACT

A system includes a bulkhead, a seat in a rearward-facing position facing away from the bulkhead, and a plurality of airbags supported by the seat. Each airbag is inflatable in a direction away from the bulkhead to an inflated position.

20 Claims, 5 Drawing Sheets

VEHICLE SEAT AIRBAGS

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities.

DETAILED DESCRIPTION

Figure 1:
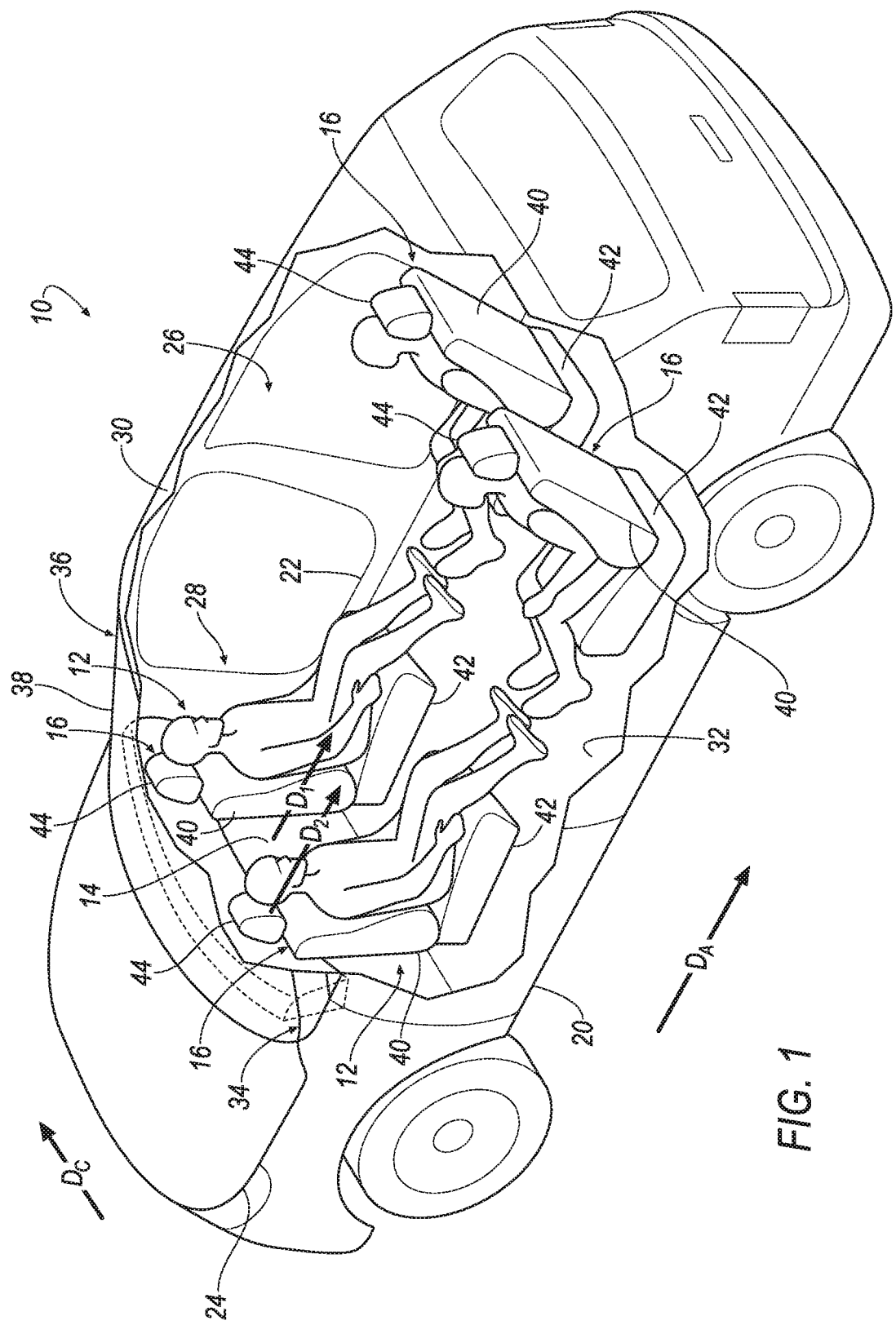
FIG. 1 is a perspective view of a vehicle include two seats in a rearward-facing position.

A system includes a bulkhead, a seat in a rearward-facing position facing away from the bulkhead, and a plurality of airbags supported by the seat. Each airbag is inflatable in a direction away from the bulkhead to an inflated position.

The seat may include a seatback supporting the plurality of airbags.

The airbags may be spaced from each other along a lateral axis and a vertical axis transverse to the lateral axis.

Each airbag may be elongated in the direction to a distal end spaced from the seatback in the inflated position.

The plurality of airbags may include more than three airbags. The distal ends of the airbags may be in a common plane.

The seat may include a head restraint supported by the seatback. A plurality of upper airbags may be supported by the head restraint and inflatable in a second direction away from the bulkhead to an inflated position.

The upper airbags may be spaced from each other along a lateral axis and a vertical axis transverse to the lateral axis.

The airbags may be spaced from each other along the lateral axis and the vertical axis.

In the inflated position, each airbag may be elongated in the direction to a distal end spaced from the seatback, and each upper airbag may be elongated in the second direction to a distal end spaced from the head restraint.

The plurality of airbags may include more than three airbags. The distal ends of the airbags may be in a common plane. The plurality of upper airbags may include more than three upper airbags. The distal ends of the upper airbags may be in a common second plane.

The plane and the second plane may be transverse to each other.

The system may include a processor and a memory storing instructions to inflate the plurality of airbags in response to detecting the seat is in the rearward-facing position and detecting a vehicle frontal impact.

The seat may include a tear seam disposed adjacent to each airbag. Each airbag may extend through one tear seam in the inflated position.

A seat includes a seatback and a plurality of airbags inflatable to an inflated position. The plurality of airbags are elongated transverse to the seatback in the inflated position. The plurality of airbags are supported by the seatback and spaced from each other along a lateral axis and a vertical axis transverse to the lateral axis.

Each airbag may include a distal end spaced from the seatback in the inflated position. The plurality of airbags may include more than three airbags and the distal ends of the airbags are in a common plane.

The seat may include a head restraint supported by the seatback. A plurality of upper airbags may be supported by the head restraint and spaced from each other along the lateral axis and the vertical axis.

The upper airbags may be inflatable to the inflated position. The upper airbags may be elongated transverse to the head restraint in the inflated position.

In the inflated position, each airbag may include a distal end spaced from the seatback, and each upper airbag may include a distal end spaced from the head restraint.

The plurality of airbags may include more than three airbags. The distal ends of the airbags may be in a common plane. The plurality of upper airbags may include more than three upper airbags. The distal ends of the upper airbags may be in a common second plane.

The seat may include a tear seam disposed adjacent to each airbag. Each airbag may extend through one tear seam in the inflated position.

With reference to the Figures, wherein like numerals indicate like parts throughout the several views, a vehicle 10 is generally shown. The vehicle 10 includes a system 12 having a bulkhead 14, a seat 16 in a rearward-facing position facing away from the bulkhead 14, and a plurality of airbags 18 supported by the seat 16. During a vehicle impact, the plurality of airbags 18 may be inflated from an uninflated position, shown in FIG. 2, to an inflated position, shown in FIGS. 3 and 4. During the vehicle impact, e.g., a frontal impact, the momentum of the occupant may bias the occupant against the seat 16, i.e., force the occupant into the seat 16. In other words, a back and/or a head of the occupant may be biased toward the seat 16 during the frontal impact.

Specifically, each airbag 18 is inflatable in a direction D1 away from the bulkhead 14 to the inflated position. As the airbags 18 inflate to the inflated position, the airbags 18 may extend towards the occupant. During the vehicle impact, the occupant may be forced into the airbags 18 in the inflated position. During the frontal impact, the airbags 18 may provide coverage so as to absorb energy from the back and/or head of the occupant. During these types of impacts, the airbags 18 may slow or stop the back and/or head of the occupant from impacting the seat 16.

The vehicle 10 may, for example, be any suitable type of automobile. The vehicle 10 may, for example, be an autonomous vehicle. In this situation, the vehicle 10 may allow for the elimination of a steering wheel. For example, the vehicle 10 shown in FIG. 1 does not include the steering wheel. The vehicle 10 may have a computer (not shown) that may control the operations of the vehicle 10 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 10 may include two sides 20, 22 spaced from each other in a cross-vehicle direction Dc. The sides 20, 22 of the vehicle 10 may be elongated in a vehicle fore-and-aft direction Da. Each side 20, 22 of the vehicle 10 may be similar or identical to each other.

With continued reference to FIG. 1, the vehicle 10 may include a body 24 defining a passenger cabin 26 to house occupants, if any, of the vehicle 10. The passenger cabin 26 may extend across the vehicle 10, i.e., from one side 20 to the other side 22 of the vehicle 10. The passenger cabin 26 includes the front seats disposed at a front 28 of the passenger cabin 26 and one or more rear seats (not numbered) spaced from the front seats. The rear seats may be, for example, disposed behind the front seats in the passenger cabin 26. The passenger cabin 26 may also include third-row seats (not shown) at a rear (not numbered) of the passenger cabin 26, in which case the front seats may be second-row seats (not numbered) instead of or in addition to being front seats. The front seats and the rear seats may be a same or different type of seat. The front seats and rear seats may be any suitable type of seats 16. The front seats and the rear seats may be, for example, a bucket seat, as shown in FIG. 1.

The body 24 may include a roof 30, a floor 32 spaced from the roof 30, and front pillars 34, 36 extending downwardly from the roof 30, i.e., generally towards the floor 32. The roof 30 and the floor 32 may each extend across the passenger cabin 26, i.e., from one side 20 to the other side 22 of the vehicle 10. The roof 30 may define an upper boundary of the passenger cabin 26 and the floor 32 may define a lower boundary of the passenger cabin 26.

With continued reference to FIG. 1, the front pillars 34, 36 may be spaced from each other in the cross-vehicle direction Dc. In other words, one front pillar 34 may be disposed on one side 20 of the vehicle 10, and the other front pillar 36 may be disposed on the other side 22 of the vehicle 10. The front pillars 34, 36 may be disposed at the front 28 of the passenger cabin 26, e.g., adjacent the front seats.

With continued reference to FIG. 1, the vehicle 10 may include a windshield 38 extending from one side 20 of the vehicle 10 to the other side 22 of the vehicle 10. In other words, the windshield 38 may extend from one front pillar 34 to the other front pillar 36. The windshield 38 may extend from the roof 30 along the front pillars 34, 36, i.e., towards the floor 32.

The bulkhead 14 may be disposed in front of the front seats, e.g., at the front 28 of the passenger cabin 26, as shown in FIG. 1. The bulkhead 14 may support a plurality of vehicle components. For example, the bulkhead 14 may support an instrument panel (not numbered) and/or entertainment features.

With reference to FIG. 1, the bulkhead 14 may extend from one side 20 of the vehicle 10 to the other side 22 of the vehicle 10, i.e., across the passenger cabin 26 in the cross-vehicle direction Dc. For example, the bulkhead 14 may extend from one front pillar 34 to the other front pillar 36. In other words, the front pillars 34, 36 and the windshield 38 both may extend from the roof 30 to the bulkhead 14. Additionally, the bulkhead 14 may extend from the windshield 38 to the floor 32. The bulkhead 14 may, for example, be fixed to the floor 32 from one side 20 of the vehicle 10 to the other side 22 of the vehicle 10. The bulkhead 14 may be fixed to the floor 32 in any suitable manner, e.g., welding. The bulkhead 14 may, for example, separate the passenger cabin 26 from an engine compartment of the vehicle 10.

The seats 16, i.e., the front seats and the rear seats, may include a seatback 40, a seat bottom 42, and a head restraint 44, as shown in FIG. 1. The head restraint 44 may be supported on the seatback 40 and may be stationary or movable relative to the seatback 40. The seatback 40 may be supported on the seat bottom 42 and may extend upwardly from the seat bottom 42, as set forth further below. The seatback 40 may be stationary or movable relative to the seat bottom 42. For example, the seatback 40 may be pivotable about the seat bottom 42, as set forth further below. The seatback 40, the seat bottom 42, and/or the head restraint 44 may be adjustable in multiple degrees of freedom. Specifically, the seatback 40, the seat bottom 42, and/or the head restraint 44 may themselves be adjustable, in other words, may have adjustable components within themselves, and/or may be adjustable relative to each other.

Figure 2:
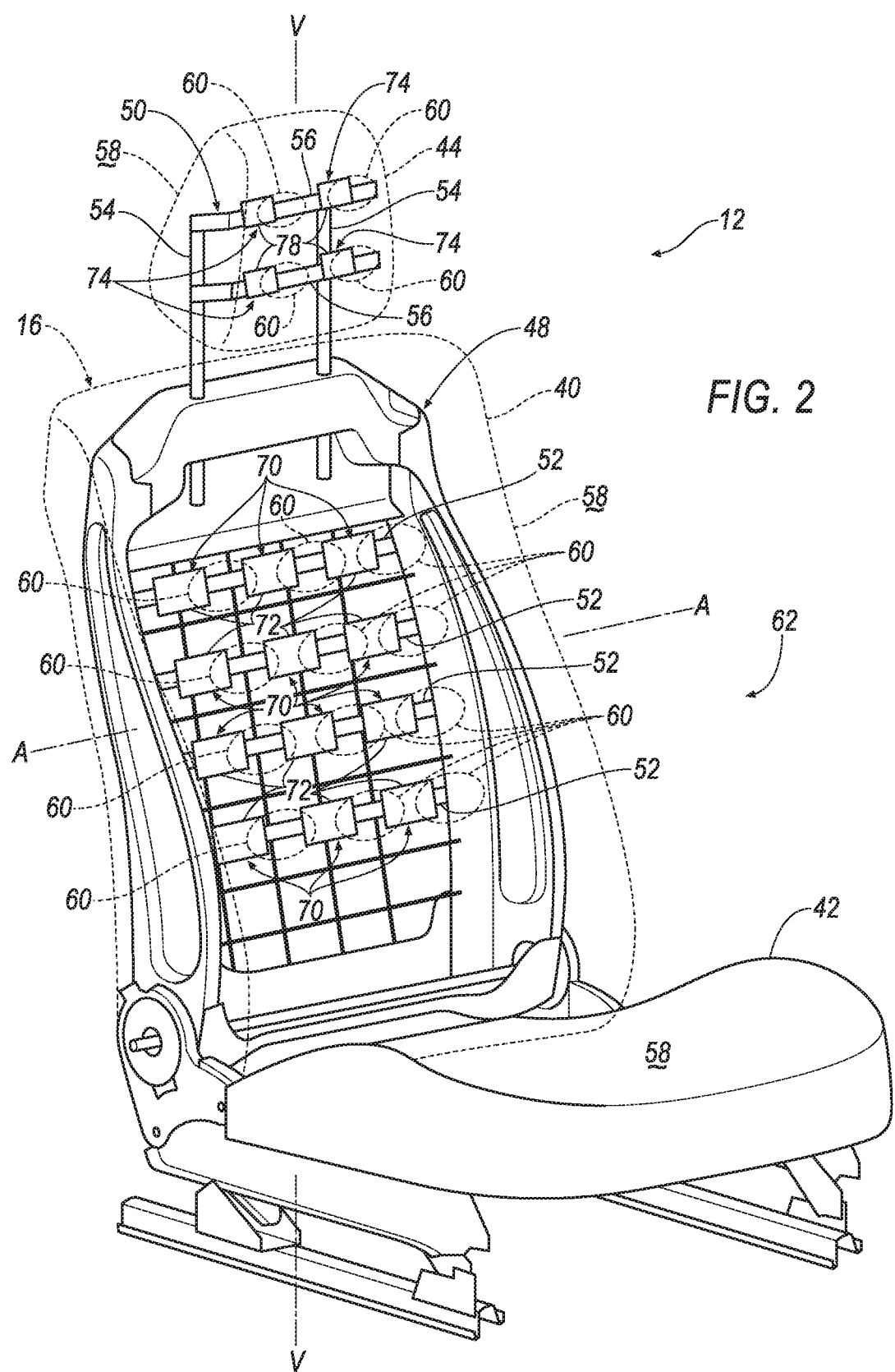
FIG. 2 is a perspective view of one of the seats including a plurality of airbag assemblies in an uninflated position.

Each seat 16 may define a lateral axis L extending from one side of the seat 16 to the other side of the seat 16, as shown in FIG. 2. The lateral axis L may, for example, extend in the cross-vehicle direction Dc. Each seat 16 may define a vertical axis V extending transverse to the lateral axis L, as shown in FIG. 2. For example, the vertical axis V may extend from the seat bottom 42 to the head restraint 44.

Each seat 16 is supported by the floor 32, as shown in FIG. 1. Each seat 16 may, for example, be fixed relative to the floor 32. In this situation, the seat 16 may be immovable relative to the floor 32. As another example, each seat 16 may slide relative to the floor 32, e.g., in the vehicle fore-and-aft direction Da. In addition to or in the alternative to sliding, each seat 16 may be rotatable relative to the floor 32. For example, each seat 16 may be supported by a pivotable base supported by the floor 32, supported by a track fixed to the floor 32, etc. Each seat 16 may pivot about the vertical axis V, e.g., enabling an occupant of such seat to pivot the seat 16 to a forward-facing position, the rearward-facing position, a rightward-facing position, or a leftward-facing position. The forward-facing position may face the bulkhead 14, i.e., in a vehicle forward direction. In other words, the occupant of the seat 16 faces the bulkhead 14, i.e., the front 28 of the passenger cabin 26, when the seat 16 is in the forward-facing position. The rearward-facing position may face away from the bulkhead 14, i.e., in a vehicle-rearward direction. In other words, the occupant of the seat 16 faces away from the bulkhead 14, i.e., the rear of the passenger cabin 26, when the seat 16 is in the rearward-facing position. Each of the rightward-facing position and the leftward-facing position faces one side 20, 22 of the vehicle 10, respectively. In other words, the seat 16 may rotatable to face in different directions. The seat 16 may rotate completely, i.e., 360° about the vertical axis. As shown in FIG. 1, the front seats may, for example, be in the rearward-facing position, and the rear seats may, for example, be in the forward-facing position.

Each seat 16 may include a seatback frame 48 and a head restraint frame 50 supported by the seatback frame 48, as shown in FIG. 2. The seatback frame 48 and the head restraint frame 50 may include tubes, beams, etc. The seatback frame 48 and the head restraint frame 50 may be formed of a same or different material. The seatback frame 48 and the head restraint frame 50 may be formed of any suitable plastic material, e.g., carbon fiber reinforced plastic (CFRP), glass fiber-reinforced semi-finished thermoplastic composite (organosheet), etc. As another example, some or all components of the seatback frame 48 and the head restraint frame 50 may be formed of a suitable metal, e.g., steel, aluminum, etc.

The seatback frame 48 may include a plurality of supports 52 extending across the seatback 40, e.g., from one side of the seat 16 to the other side of the seat 16. In other words, the supports 52 may extend along the lateral axis L. The supports 52 may be spaced from each other along the vertical axis V. The seatback frame 48 may include any suitable number of supports 52.

The head restraint frame 50 may include lateral supports 54 spaced from each other along the lateral axis L. The lateral supports 54 are engaged with the seatback 40, e.g., the seatback frame 48. For example, the lateral supports 54 may be slidable relative to the seatback 40, e.g., the seatback frame 48. The head restraint frame 50 may include a plurality of brackets 56 extending from one lateral support 54 to the other lateral support 54, i.e., along the lateral axis L. The brackets 56 may be spaced from each other along the vertical axis V. The head restraint frame 50 may include any suitable number of brackets 56.

A covering 58 may be supported on the seatback frame 48 and the head restraint frame 50. The covering 58 may include upholstery and padding. The upholstery may be formed of cloth, leather, faux leather, or any other suitable material. The upholstery may be stitched in panels around the frame. The padding may be between the covering 58 and the seatback frame 48 and may be foam or any other suitable material.

With reference to FIG. 2, the seat 16, e.g., the covering 58, may include a tear seam 60 disposed adjacent to each airbag 18. Said differently, each airbag 18 may extend through one tear seam 60 in the inflated position. In other words, the seatback 40 and the head restraint 44 may each include a plurality of tear seams 60. The tear seam 60 may have any suitable shape. For example, the tear seam 60 may have a circular shape, e.g., extending around the airbag. Alternatively, the tear seam 60 may have a linear shape, i.e., extending in a line along the lateral axis L.

The tear seams 60 may be designed to tear apart when subjected to a tensile force above a threshold magnitude. In other words, the cover on one side of the tear seam 60 separates from the covering 58 on the other side of the tear seam 60 when the force is above the threshold magnitude. The threshold magnitude may be chosen to be greater than forces from, e.g., inadvertent pushing against the seatback 40 by an occupant but be less than forces from the deployment of the airbag. The tear seam 60 may be, for example, a line of perforations through the covering 58, a line of thinner covering 58 material than the rest of the covering 58, etc.

Figure 3:
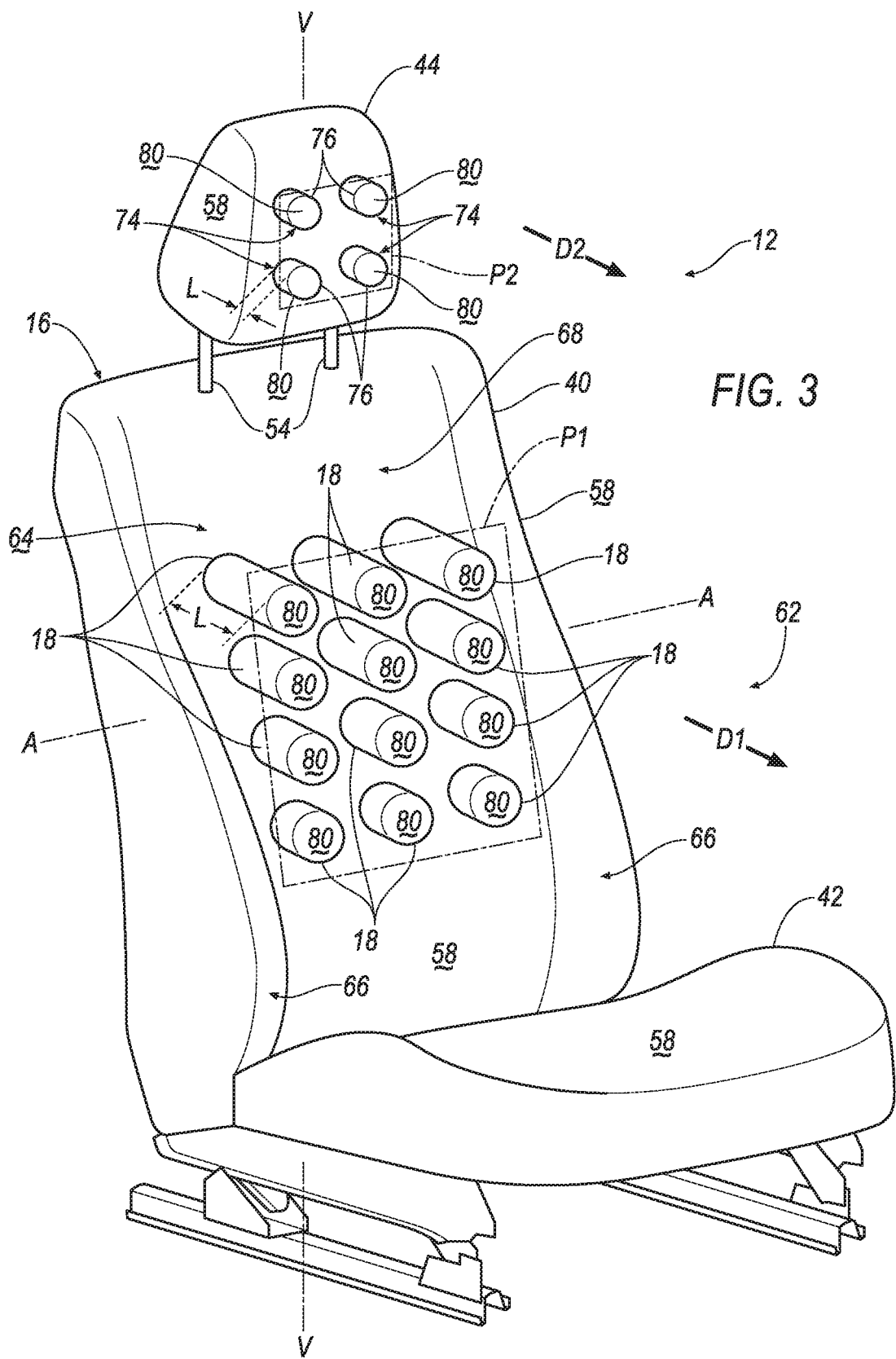
FIG. 3 is a perspective view of the seat including the plurality of airbags in the inflated position.
Figure 4:
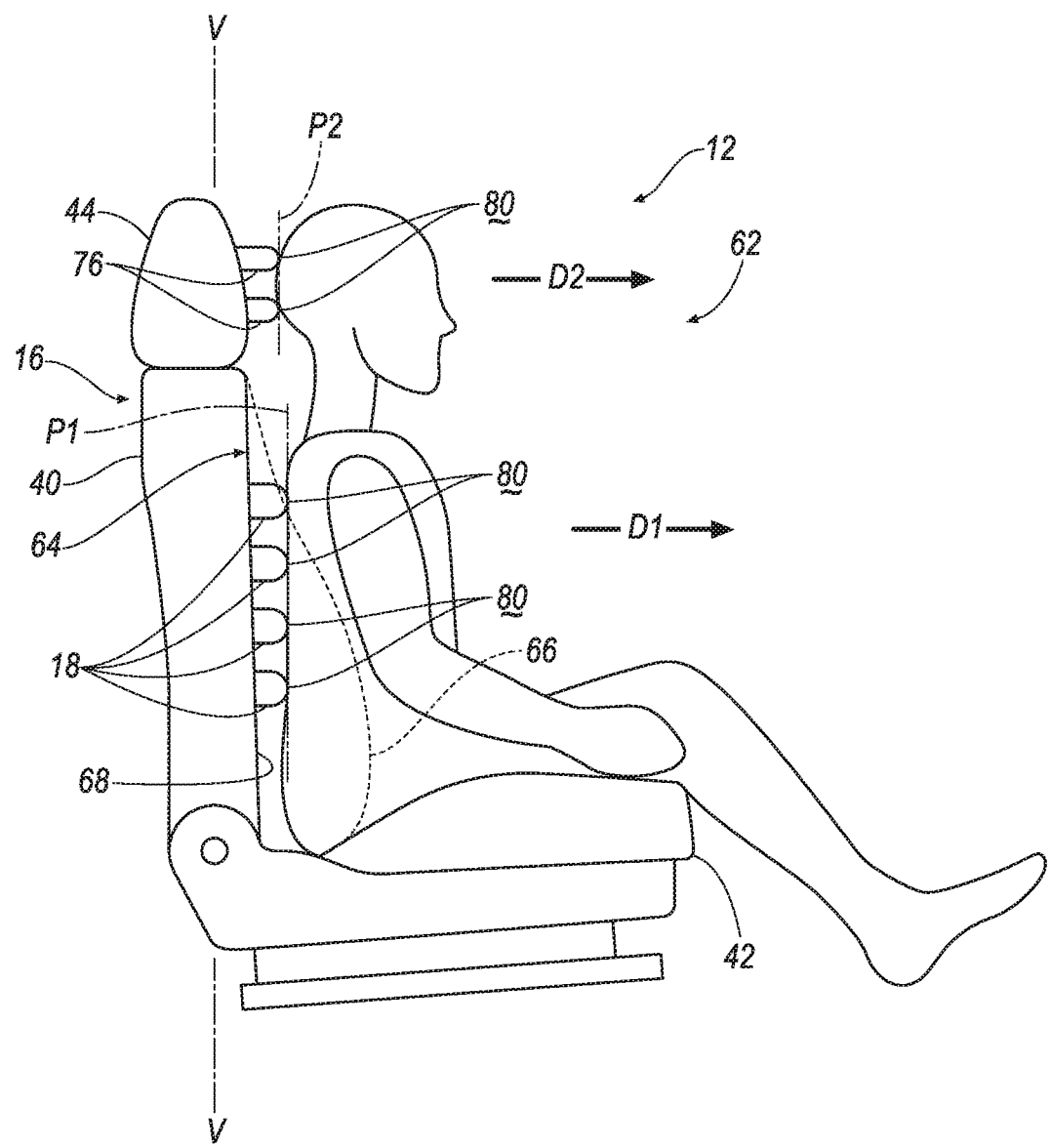
FIG. 4 is a side view of the seat including the plurality of airbags in the inflated position.

The seatback 40 may define an occupant seating area 62, as shown in FIGS. 2-4. The occupant may be disposed in the occupant seating area 62. The occupant seating area 62 may be on a front side 64 of the seatback 40. The front side 64 of the seatback 40 may, for example, face away from the bulkhead 14 in the rearward-facing position, e.g., in the vehicle-rearward direction. The seatback 40 may include a back side (not shown) facing the opposite direction as the front side 64, e.g., toward the bulkhead 14 in the rearward-facing position.

The front side 64 of the seatback 40 may include a bolster 66 and a backrest 68 adjacent to the bolster 66. Specifically, the front side 64 of the seatback 40 includes two bolsters 66 and the backrest 68 extends from one of the bolsters 66 to the other of the bolsters 66. The backrest 68 and the bolsters 66 are supported by the seatback frame 48. The seatback 40 may terminate at the bolsters 66. In other words, the bolsters 66 define left and right boundaries of the seatback 40 relative to an occupant of the seat 16. The backrest 68 extends between the bolsters 66 to support the back of an occupant seated on the seat 16. The bolsters 66 protrude forward from the backrest 68 such that the bolsters 66 extend along the sides of the occupant when the back of the occupant rests on the backrest 68. The bolsters 66 may extend along the backrest 68 upwardly from the seat bottom 42. The bolsters 66 may be formed by the padding material and the covering 58.

The system 12 may include a plurality of airbag assemblies 70, which includes the plurality of airbags 18. The seat 16 may support the airbag assemblies 70, and specifically, may support the plurality of airbags 18 when the plurality of airbags 18 are in the inflated position. The airbag assembly 70 may be mounted to the seat 16, as set forth below. The airbag assemblies 70 may be supported on any one seats 16, e.g., the two front seats shown in the figures or any seat that can face rearward.

Each airbag assembly 70 may include a base 72 attached to the seat 16 and supporting at least one airbag 18. The base 72 may be flat. As another example, the base 72 may include a cavity (not shown) that may house at least one airbag 18 in the uninflated position and may support at least one airbag 18 on the seat 16 in the inflated position. In other words, the base 72 may be a housing. The base 72 may, for example, include clips, panels, etc. for attaching the at least one airbag 18 and for attaching the airbag assembly 70 to the seat 16.

The system 12 may include any suitable number of airbag assemblies 70. For example, the system 12 may include a plurality of airbag assemblies 70 fixed to each support 52 of the seatback frame 48, as shown in FIG. 2. In this situation, the airbag assemblies 70 may be spaced from each other along the lateral axis L. Additionally, each airbag assembly 70 may include one airbag 18. As another example, the system 12 may include one airbag assembly 70 fixed to each support 52 of the seatback frame 48. In this situation, each airbag assembly 70 may include more than one airbag 18 spaced from each other along the lateral axis L. The system 12 may include any suitable number of airbags 18, e.g., more than three airbags 18.

The airbags 18 may be formed of any suitable type of material, e.g., from a woven polymer. For example, the airbag may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbags 18 may be a single continuous unit, e.g., a single piece of fabric. Alternatively, the airbags 18 may include a plurality of segments, i.e., two or more. The segments may be attached to each other in any suitable fashion, e.g., a plurality of panels attached by stitching, ultrasonic welding, etc.

The plurality of airbags 18 may be supported by the seatback 40, as shown in FIGS. 2-4. Specifically, the airbags assemblies 70 may be fixed to the supports 52, as set forth above. The plurality of airbags 18 may, for example, be disposed between the bolsters 66, e.g., on the backrest 68 of the seatback 40, as shown in the Figures. The plurality of airbags 18 may, for example, be disposed in the seatback 40 in the uninflated position, e.g., between the covering 58 and the seatback frame 48, as shown in FIG. 2. As another example, the plurality of airbags 18 may be disposed on the seatback 40, i.e., external to the covering 58 in the uninflated position. In the inflated position, the plurality of airbags 18 may extend through the front side 64, e.g., the backrest 68, of the seatback 40.

The plurality of airbags 18 may be spaced from each other along the lateral axis L and the vertical axis V, as shown in FIG. 3. In other words, the plurality of airbags 18 may be spaced from each other throughout the seatback 40. The plurality of airbags 18 may be spaced from each other by any suitable distance. For example, the spacing may be the same between each airbag 18 or may vary. The plurality of airbags 18 may be arranged on the seatback 40 in any suitable pattern.

The system 12 may include a plurality of airbag assemblies 74 (also referred to as upper airbag assemblies 74), which include a plurality of airbags 76 (also referred to as upper airbags 76). The upper airbags 76 may be inflatable from the uninflated position, as shown in FIG. 2, to the inflated position, as shown in FIGS. 3 and 4, in a second direction D2 away from the bulkhead 14. The seat 16 may support the upper airbag assemblies 74, and specifically, may support the upper airbags 76 when the upper airbags 76 are in the inflated position. The upper airbag assemblies 74 may be mounted to the seat 16, as set forth below.

Each upper airbag assembly 74 may include a base 78 attached to the seat 16 and supporting at least one upper airbag 76. The base 78 may be flat. As another example, the base 78 may include a cavity (not shown) that may house at least one upper airbag 76 in the uninflated position and may support at least one upper airbag 76 on the seat 16 in the inflated position. In other words, the base 78 may be a housing. The base 78 may, for example, include clips, panels, etc. for attaching the at least one upper airbag 76 and for attaching the upper airbag assembly 74 to the seat 16.

The system 12 may include any suitable number of upper airbag assemblies 74. For example, the system 12 may include a plurality of upper airbag assemblies 74 fixed to each bracket 56 of the head restraint frame 50, as shown in FIG. 2. In this situation, the upper airbag assemblies 74 may be spaced from each other along the lateral axis L. Additionally, each upper airbag assembly 74 may include one upper airbag 76. As another example, the system 12 may include one upper airbag assembly 74 fixed to each bracket 56 of the head restraint frame 50. In this situation, each upper airbag assembly 74 may include more than one upper airbag 76 spaced from each other along the lateral axis L. As yet another example, the system 12 may lack an upper airbag assembly 74. The system 12 may include any suitable number of upper airbags 76, e.g., more than three upper airbags 76.

The upper airbags 76 may be formed of a same or different material as the airbags 18. The upper airbags 76 may be a single continuous unit, e.g., a single piece of fabric. Alternatively, the upper airbags 76 may include a plurality of segments, i.e., two or more. The segments may be attached to each other in any suitable fashion, e.g., a plurality of panels attached by stitching, ultrasonic welding, etc.

The plurality of upper airbags 76 may be supported by the head restraint 44, as shown in FIGS. 2-4. Specifically, the upper airbag assemblies 74 may be fixed to the brackets 56, as set forth above. The plurality of upper airbags 76 may, for example, be disposed on the head restraint 4, e.g., external to the covering 58. Specifically, the upper airbags 76 may be disposed between the lateral supports 54 of the head restraint 44. As another example, the upper airbags 76 may be disposed in the head restraint 44 in the uninflated position, e.g., between the covering 58 and the head restraint frame 50, as shown in the Figures.

The plurality of upper airbags 76, may be spaced from each other along the lateral axis L and the vertical axis V, as shown in FIG. 3. In other words, the plurality of upper airbags 76 may be spaced from each other throughout the head restraint 44. The plurality of upper airbags 76 may be spaced from each other by any suitable distance. For example, the spacing may be the same between each upper airbag 76 or may vary. The plurality of upper airbags 76 may be arranged on the head restraint 44 in any suitable pattern.

The airbags 18 and the upper airbags 76 may have a same or a different shape. The airbags 18 and the upper airbags 76 may have any suitable shape. For example, the airbags 18 and the upper airbags 76 may be generally cylindrical in the inflated position, as shown in FIGS. 3 and 4. As another example, the airbags 18 and the upper airbags 76 may taper in the direction D1 and the second direction D2, respectively, i.e., toward the occupant, or may taper in a direction toward the bulkhead 14, i.e., away from the occupant. Alternatively, the airbags 18 and the upper airbags 76 may be a frustum, a sphere, a trapezoid, or any other suitable shape. The airbags 18 may each have the same shape, or some or all of the airbags 18 may have a different shape, and the upper airbags 76 may each have the same shape, or some or all of the upper airbags may have a different shape.

The airbags 18 and the upper airbags 76 may have a same or a different size, e.g., diameter. The airbags 18 and the upper airbags 76 may have any suitable size. For example, the upper airbags 76 may have a smaller size, e.g., diameter, than the airbags 18, as shown in FIGS. 3 and 4. Each of the airbags 18 may have the same size, or some or all of the airbags 18 may be sized differently than each other, and each of the upper airbags 76 may have the same size, or some or all of the upper airbags 76 may be sized differently than each other.

In the uninflated position, the airbags 18 and the upper airbags 76 may be covered by the covering 58, as shown in FIG. 2. In the inflated position, the airbags 18 and the upper airbags 76 each may be transverse to the lateral axis L and the vertical axis V of the seat 16. For example, in the inflated position, the airbags 18 and the upper airbags 76 each may extend generally towards the rear of the passenger cabin 26 when the seat 16 is in the rearward-facing position. In other words, the airbags 18 and the upper airbags 76 each may extend towards the occupant, i.e., away from the front side 64 of the seatback 40 through the occupant seating area 62, in the inflated position.

Each airbag 18 and upper airbag 76 may, for example, extend through one tear seam 60 in the inflated position. In other words, each airbag 18 may extend through the seatback 40, i.e., the covering 58, and each upper airbag 76 may extend through the head restraint 44, i.e., the covering 58, as shown in FIG. 3. In such an example, each airbag 18 and upper airbag 76 may extend into the occupant seating area 62 in the inflated position, as shown in FIGS. 3 and 4. Alternatively, each airbag 18 and upper airbag 76 may remain covered by the covering 58 in the inflated position. In this situation, the airbags 18 may push the covering 58 away from the seatback frame 48 in the direction D1 away from the bulkhead 14 and the upper airbags 76 may push the covering 58 away from the head restraint frame 50 in the direction D1 away from the bulkhead 14.

Each of the airbags 18 and the upper airbags 76 may include a distal end 80 spaced from the seat 16 in the inflated position. Specifically, the distal ends 80 of the upper airbags 76 may be spaced from the head restraint 44 and the distal ends 80 of the airbags 18 may be spaced from the seatback 40 in the inflated position. For example, the distal ends 80 of the upper airbags 76 and the airbags 18 may be disposed in the occupant seating area 62 in the inflated position.

Each of the airbags 18 and the upper airbags 76 may be elongated from the seat 16 to the distal end 80 in the inflated position. Specifically, each of the airbags 18 may be elongated in the direction D1 to the distal ends 80 spaced from the seatback 40 in the inflated position, and each of the upper airbags 76 may be elongated in the second direction D2 to the distal ends 80 spaced from the head restraint 44 in the inflated position. Each of the airbags 18 and the upper airbags 76 may have a length L determined from the seat 16 to the distal end 80. In other words, the length L of each of the airbags 18 and the upper airbags 76 may be determined from the extension of the airbag in the direction D1 and the second direction D2, respectively, in the inflated position. The airbags 18 and the upper airbags 76 may have any suitable length L. The airbags 18 and the upper airbags 76 may have a same or a different length L.

The airbags 18 may each have the same length L, or some or all of the airbags 18 may have a different length L. The distal ends 80 of the airbags 18 are in a common plane P1 spaced from the seatback 40. In other words, the airbags 18 terminate in the plane P1. For example, the some of the airbags 18 may have varying lengths L, e.g., due to a slope of the seatback 40 causing the airbags 18 disposed closer to the head restraint 44 to be farther from the back of an occupant as compared to airbags 18 disposed closer to the seat bottom 42, as shown in FIG. 4.

The upper airbags 76 may each have the same length L, or some or all of the upper airbags 76 may have a different length L. The distal ends 80 of the upper airbags 76 are in a common second plane P2 spaced from the head restraint 44. In other words, the upper airbags 76 terminate in the second plane P2. For example, the upper airbags 76 each may have the same length L, as shown in FIG. 4. The plane P1 and the second plane P2 may, for example, be aligned with each other in the vehicle fore-and-aft direction Da. As another example, the plane P1 and the second plane P2 may be spaced from each other in the vehicle-fore-and-aft direction Da, i.e., in the direction D1 away from the bulkhead 14, as shown in FIG. 4.

In the inflated position, the airbags 18 and the upper airbags 76 may extend in a same or different direction. For example, the airbags 18 and the upper airbags 76 may be parallel to each other, i.e., extend in the same direction, in the inflated position, as shown in FIG. 4. In other words, the direction D1 away from the bulkhead 14 may be parallel to the second direction D2 away from the bulkhead 14. In this situation, the plane P1 and the second plane P2 may be parallel to each other, as shown in FIG. 4. Alternatively, the airbags 18 and the upper airbags 76 may not be parallel to each other. In other words, the direction D1 away from the bulkhead 14 may be transverse to the second direction D2 away from the bulkhead 14. In this situation, the plane P1 and the second plane P2 may be transverse to each other.

The system 12 includes an inflator 82. The inflator 82 may be supported by any suitable component, e.g., the seatback 40, the seat bottom 42, the body 24, etc. The system 12 may include any suitable number of inflators 82. For example, the system 12 may include one inflator 82. In this situation, the inflator 82 is in fluid communication with the airbags 18 and the upper airbags 76 to inflate the airbags 18 and the upper airbags 76 from the uninflated position to the inflated position. For example, the inflator 82 expands the airbags 18 and the upper airbags 76 with an inflation medium, such as a gas, to move the airbags 18 from the uninflated position to the inflated position. In such an example, the system 12 may include one fill tube (not shown). The inflator 82 may be in fluid communication with the airbags 18 and the upper airbags 76 via the fill tube. In other words, the fill tube may be in fluid communication with each of the airbags 18 and the upper airbags 76. Alternatively, the system 12 may include a plurality of inflators 82. For example, each airbag assembly 70 and each upper airbag assembly 74 may include one inflator 82. As another example, the system 12 may include two inflators 82, e.g., one inflator 82 supported by the seatback 40 and one inflator 82 supported by the head restraint 44. In such an example, the system 12 may include two fill tubes, e.g., the one inflator 82 may be in fluid communication with the airbags 18 through one fill tube, and the other inflator 82 may be in fluid communication with the upper airbags 76 through the other fill tube.

The inflator 82 may be, for example, a pyrotechnic inflator that uses a chemical reaction to drive the inflation medium into the airbag. Alternatively, the inflator 82 may be, for example, a cold-gas inflator that, when activated, ignites a pyrotechnic charge that creates an opening for releasing the pressurized inflation medium to the airbag via the fill tube. Alternatively, the inflator 82 may be of any suitable type, for example, a hybrid inflator.

Figure 5:
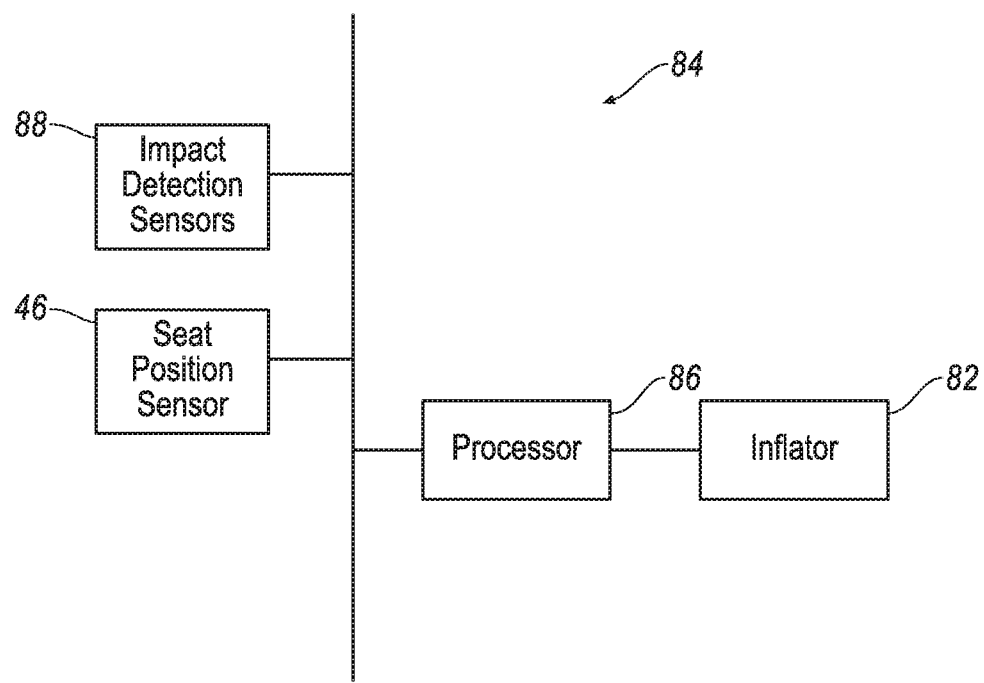
FIG. 5 is a block diagram of an inflation system of the vehicle.

With reference to FIG. 5, the vehicle 10 may include an inflation system 84 having a computer. The computer may be a microprocessor-based computing device implemented via circuits, chips, or other electronic components. For example, the computer may include a processor 86, memory, etc. The memory may store instructions executable by the processor 86 and the processor 86 may read the instructions from the memory and execute the instructions. The processor 86 may be programmed to initiate an inflation of the airbags 18 and the upper airbags 76 in response to detecting the seat 16 is in the rearward-facing position and detecting a vehicle frontal impact, as set forth further below.

The vehicle 10 may include seat position sensors 46 programmed to detect the position of the seat 16. The vehicle 10 may include any suitable number of seat position sensors 46, e.g., one seat position sensor 46 for each seat 16. The seat position sensor 46 may be mounted to any suitable component of the vehicle 10, e.g., the seat 16, the floor 32, etc. The processor 86 may receive one or more signals from the seat position sensors 46 indicating the position of the seat 16, e.g., the rearward-facing position, the forward-facing position, etc.

The vehicle 10 may include impact detection sensors 88 programmed to detect the impact to the vehicle 10. The impact detection sensors 88 may be disposed in the vehicle 10. The impact detection sensors 88 may be of various types, e.g., pressure sensor, acceleration sensor, vision sensor, etc. When the vehicle impact occurs, the processor 86 may receive one or more signals from the impact detection sensors 88 indicating the vehicle impact, e.g., a frontal impact.

In response to receiving the signals from the seat position sensors 46 indicating the seat 16 is in the rearward-facing position and the signals from the impact detection sensors 88 indicating a vehicle frontal impact, the processor 86 may be programmed to initiate inflation of the airbags 18 and/or the upper airbags 76. Said differently, the processor 86 may be programmed to not initiate inflation of the airbags 18 and/or the upper airbags 76 when the seat 16 is not in the rearward-facing position and/or when the vehicle impact is not a frontal vehicle impact. In other words, the processor 86 is programmed to initiate inflation of the airbags 18 and/or the upper airbags 76 selectively based on the information from the seat position sensors 46 identifying the position of the seat 16, e.g., the rearward-facing position, the forward-facing position, etc., and the information from the impact detection sensors identifying the physical characteristics of the vehicle impact, e.g., which side of the vehicle 10 impacted, amount of pressure applied to the vehicle 10, etc.

In order to receive the signals from the sensors, e.g., the impact detection sensors 88 and the seat position sensors 46, and to initiate the inflation of the airbags 18 and the upper airbags 76, the processor 86 communicates with the sensors, e.g., the impact detection sensors 88 and the seat position sensor 46, and the inflator 82, e.g., through a direct electrical wiring, through which an analog or a digital signal is transmitted, or through a communication network like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbags 18 and the upper airbags 76 are in the uninflated position, under normal operating conditions of the vehicle 10. The occupant may rotate the seat 16 to any suitable position, e.g., the rearward-facing position. The seat position sensor 46 transmits a signal indicating the position of the seat 16 through the communications network to the computer. In the event of a frontal impact, the impact detection sensor 88 detects the impact. The impact detection sensor 88 transmits a signal indicating the frontal impact collision through the communications network to the computer. When the seat 16 is in the rearward-facing position and a frontal impact is detected, the computer transmits a signal through the communications network triggering the inflator 82 to inflate the airbags 18 and the upper airbags 76 with inflation medium from the uninflated position to the inflated position. When the inflator 82 inflates the airbags 18 and the upper airbags 76 to the inflated position, the inflation medium flows to the inflation chamber increasing the pressure in the inflation chamber. As the pressure is increased in the inflation chamber, the airbags 18 and the upper airbags 76 break through the tears seams 60 of the seatback 40 and the head restraint 44, respectively. In this situation, the airbags 18 and the upper airbags 76 extend away from the seat 16, e.g., the seatback 40 and the head restraint 44, towards the occupant. As the occupant moves towards the seat 16, e.g., the seatback 40 and the head restraint 44, due to the momentum of the vehicle impact, the occupant moves towards the distal ends 80 of the airbags 18 and the upper airbags 76. When the occupant impacts the airbags 18 and the upper airbags 76, the back and the head of the occupant may impact the airbags 18 and the upper airbags 76, respectively, such that the airbags 18 and the upper airbags 76 absorb energy from the back and the head of the occupant. In other words, the airbags 18 and the upper airbags 76 may absorb energy from the occupant, which may assist in reducing impact injuries to the back and the head of the occupant of the seat 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a bulkhead;
   a seat in a rearward-facing position facing away from the bulkhead, the seat includes a seatback, the seatback having a front side defining an occupant seating area, the front side having two bolsters and a backrest extending from one bolster to the other bolster; and
   a plurality of airbags supported by the seatback, each airbag inflatable in a direction away from the bulkhead to an inflated position;
   wherein the airbags are elongated in the direction through the backrest to a distal end of the airbag disposed in the occupant seating area in the inflated position; and
   wherein the plurality of airbags includes more than three airbags and the distal ends of the airbags are in a common plane in the inflated position.

2. The system of claim 1, wherein the seat defines a lateral axis and a vertical axis transverse to the lateral axis, the airbags are spaced from each other along the lateral axis and the vertical axis.

3. The system of claim 1, wherein the seat includes a head restraint supported by the seatback, a plurality of upper airbags supported by the head restraint and inflatable in a second direction away from the bulkhead to an inflated position.

4. The system of claim 3, wherein the seat defines a lateral axis and a vertical axis transverse to the lateral axis, the upper airbags are spaced from each other along the lateral axis and the vertical axis.

5. The system of claim 4, wherein the airbags are spaced from each other along the lateral axis and the vertical axis.

6. The system of claim 3, wherein, in the inflated position, each upper airbag is elongated in the second direction to a distal end spaced from the head restraint.

7. The system of claim 6, wherein the plurality of upper airbags includes more than three upper airbags, the distal ends of the upper airbags are in a common second plane.

8. The system of claim 7, wherein the plane and the second plane are transverse to each other.

9. The system of claim 1, further comprising a processor and a memory storing instructions to inflate the plurality of airbags in response to detecting the seat is in the rearward-facing position and detecting a vehicle frontal impact.

10. The system of claim 1, wherein the seat includes a tear seam disposed adjacent to each airbag, each airbag extending through one tear seam in the inflated position.

11. A seat comprising:
a seatback defining a lateral axis and a vertical axis transverse to the lateral axis, the seatback including a front side defining an occupant seat area, the front side having two bolsters and a backrest extending from one bolster to the other bolster;
a plurality of airbags inflatable to an inflated position,
the plurality of airbags supported by the seatback and spaced from each other along the lateral axis and the vertical axis; and
the airbags are elongated through the backrest to a distal end of the airbag disposed in the occupant seating area in the inflated position, the plurality of airbags includes more than three airbags and the distal ends of the airbags are in a common plane in the inflated position.

12. The seat of claim 11, further comprising a head restraint supported by the seatback, a plurality of upper airbags supported by the head restraint and spaced from each other along the lateral axis and the vertical axis.

13. The seat of claim 12, wherein the upper airbags are inflatable to the inflated position, the upper airbags being elongated transverse to the head restraint in the inflated position.

14. The seat of claim 12, wherein, in the inflated position, each upper airbag includes a distal end spaced from the head restraint.

15. The seat of claim 14, wherein the plurality of upper airbags includes more than three upper airbags, the distal ends of the upper airbags are in a common second plane.

16. The seat of claim 11, further comprising a tear seam disposed adjacent to each airbag, each airbag extending through one tear seam in the inflated position.

17. The seat of claim 11, further comprising a seat bottom supporting the seatback and a base supporting the seat bottom, the seat bottom is rotatable about the vertical axis relative to the base.

18. The seat of claim 15, wherein the plane and the second plane are transverse to each other.

19. The system of claim 1, wherein the airbags are generally cylindrical in the inflated position.

20. The seat of claim 11, wherein the airbags are generally cylindrical in the inflated position.

* * * * *